US012785007B2

(12) United States Patent
Takahashi et al.

(10) Patent No.: US 12,785,007 B2
(45) Date of Patent: Nov. 3, 2026

(54) SWITCH STRUCTURE AND ACOUSTIC PROCESSING DEVICE HAVING THE SWITCH STRUCTURE

(71) Applicant: YAMAHA CORPORATION, Hamamatsu (JP)

(72) Inventors: Yuji Takahashi, Hamamatsu (JP); Yuji Haga, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 281 days.

(21) Appl. No.: 18/618,319

(22) Filed: Mar. 27, 2024

(65) Prior Publication Data

US 2024/0242904 A1 Jul. 18, 2024

Related U.S. Application Data

(63) Continuation of application No. PCT/JP2022/007690, filed on Feb. 24, 2022.

(30) Foreign Application Priority Data

Sep. 29, 2021 (JP) ................................ 2021-159285

(51) Int. Cl.
*H01H 13/14* (2006.01)
*G10H 1/34* (2006.01)
(Continued)

(52) U.S. Cl.
CPC .............. *H01H 13/14* (2013.01); *G10H 1/34* (2013.01); *H01H 13/04* (2013.01); *H01H 13/52* (2013.01); *H01H 13/705* (2013.01)

(58) Field of Classification Search
CPC ...... H01H 3/125; H01H 13/705; H01H 13/14; H01H 13/04; H01H 13/10; H01H 13/70;
(Continued)

(56) References Cited

U.S. PATENT DOCUMENTS

2003/0150703 A1 8/2003 Tsau
2005/0274593 A1 * 12/2005 Kawano .................. H01H 3/12 200/314

(Continued)

FOREIGN PATENT DOCUMENTS

CN 204067118 U 12/2014
JP S63153431 U 10/1988

(Continued)

OTHER PUBLICATIONS

International Search Report issued in Intl. Appln. No. PCT/JP2022/007690, mailed Apr. 26, 2022. English translation provided.

(Continued)

*Primary Examiner* — Ahmed M Saeed

(74) *Attorney, Agent, or Firm* — ROSSI, KIMMS & McDOWELL LLP

(57) ABSTRACT

A switch structure includes: first and second guided portions extending from a head at different positions relative to the head; first and second restriction portions provided in the housing and facing the first and second guided portions, respectively. During pressing of the head, the first guided portion moves while being guided by the first restriction portion, and the second guided portion moves while being guided by the second restriction portion, and a direction of movement of the first guided portion is restricted by the first restriction portion and is not parallel to a direction of movement of the second guided portion that is restricted by the second restriction portion.

15 Claims, 9 Drawing Sheets

(51) Int. Cl.

| | |
|---|---|
| ***H01H 13/04*** | (2006.01) |
| ***H01H 13/52*** | (2006.01) |
| ***H01H 13/705*** | (2006.01) |

(58) Field of Classification Search

CPC ............. H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20

See application file for complete search history.

(56) References Cited

U.S. PATENT DOCUMENTS

| | | | | |
|---|---|---|---|---|
| 2017/0309419 | A1 | 10/2017 | Miyaoka | |
| 2021/0065666 | A1 | 3/2021 | Terada et al. | |
| 2021/0181861 | A1* | 6/2021 | Cai | G06F 3/0202 |

FOREIGN PATENT DOCUMENTS

| | | | |
|---|---|---|---|
| JP | H0496925 | U | 8/1992 |
| JP | H0722019 | Y2 | 5/1995 |
| JP | 2002093276 | A | 3/2002 |
| JP | 2005353409 | A | 12/2005 |
| JP | 2006012469 | A | 1/2006 |
| JP | 2016151698 | A | 8/2016 |
| JP | 6404135 | B2 | 10/2018 |

OTHER PUBLICATIONS

Written Opinion issued in Intl. Appln. No. PCT/JP2022/007690, mailed Apr. 26, 2022.

Extended European Search Report issued in European Appln. No. 22875370.3 mailed Jul. 17, 2025.

* cited by examiner

SWITCH STRUCTURE AND ACOUSTIC PROCESSING DEVICE HAVING THE SWITCH STRUCTURE

CROSS-REFERENCE TO RELATED APPLICATIONS

This is a continuation of International Application No. PCT/JP2022/007690 filed on Feb. 24, 2022, and claims priority from Japanese Patent Application No. 2021-159285 filed on Sep. 29, 2021, the entire content of which is incorporated herein by reference.

FIELD

The present disclosure relates to a switch structure and an acoustic processing device having the switch structure.

BACKGROUND

In the related art, a switch structure having a pressing operation portion to be pressed is known. JP2016-151698A discloses a structure in which a key as the pressing operation portion is displaced in parallel to a press-in direction in a keyboard apparatus. Further, JPH07-022019Y2 discloses a keyboard for a computer in which a plate extending from a key as an pressing operation portion is disposed outside an annular collar extending upward from a guide plate. When the plate extending from the key is guided in the collar, a movement of the pressing operation portion in the press-in direction is guided.

SUMMARY

However, in JP2016-151698A, a configuration of parallel maintaining means for ensuring a parallel movement of the key in the press-in direction is complicated. Further, in JPH07-022019Y2, since the plate to be guided extending from the key can be easily viewed from the outside, there is room for improvement from the viewpoint of improving appearance.

An object of the present disclosure is to provide a switch structure capable of ensuing a smooth parallel movement of a pressing operation portion and suppressing deterioration in appearance with a simple configuration.

According to an aspect of the present disclosure, there is provided a switch structure of an operation switch disposed in a housing, the switch structure including: a head configured to move with respect to the housing, the head being configured to be pressed in a press-in direction parallel to a central axis of the operation switch; a first guided portion extending from the head in the press-in direction at an inner side of an outline of the head as viewed from the press-in direction; a second guided portion provided at a position different from that of the first guided portion relative to the head and extending from the head in the press-in direction; a first restriction portion provided in the housing and facing the first guided portion from an outer side of the first guided portion; and a second restriction portion provided in the housing and facing the second guided portion from an inner side of the second guided portion, in which: during pressing of the head, the first guided portion moves while being guided by the first restriction portion, and the second guided portion moves while being guided by the second restriction portion; and a direction of movement of the first guided portion is restricted by the first restriction portion and is not parallel to a direction of movement of the second guided portion that is restricted by the second restriction portion.

According to an aspect of the present disclosure, it is possible to ensure a smooth parallel movement of the pressing operation portion and to suppress deterioration in appearance with a simple configuration.

BRIEF DESCRIPTION OF DRAWINGS

The present disclosure will be described in detail based on the following figures, wherein.

DETAILED DESCRIPTION

Hereinafter, an embodiment of the present disclosure will be described with reference to the drawings.

Figure 1:
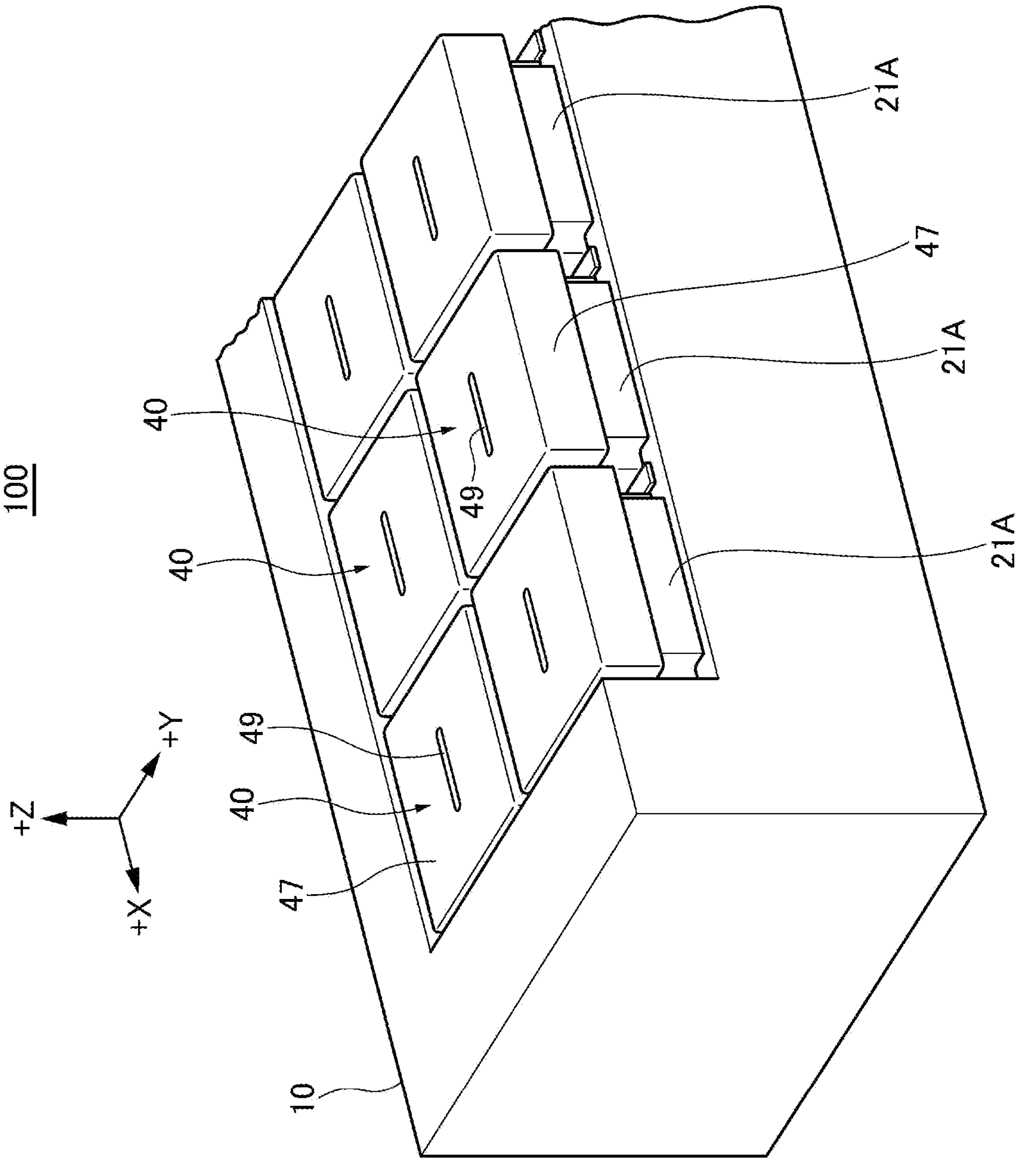
FIG. 1 is a partial perspective view of an electronic device to which a switch structure is applied.

FIG. 1 is a partial perspective view of an electronic device to which a switch structure according to an embodiment of the present disclosure is applied. The electronic device is configured as an acoustic processing device 100 as an example. The acoustic processing device 100 is, for example, a sequencer that inputs sound information, and includes a plurality of types of operators. A user can input sound information including parameters such as effects in addition to rhythm and melody by operating (pressing) the operators. The acoustic processing device 100 may have a sound generation function.

Hereinafter, a direction of each portion will be referred to based on X, Y, and Z coordinate axes shown in FIG. 1 and the like. Here, for the sake of convenience, a Z direction is an upper-lower direction, in particular, a +Z direction is the upper direction, and a −Z direction is a lower direction. However, a posture when the acoustic processing device 100 is used is not limited, and the Z direction is not necessarily the upper-lower direction during use. The user of the acoustic processing device 100 is usually situated on a +Y side of the acoustic processing device 100. Therefore, a +X side is the left side as viewed from the user.

Figure 2:
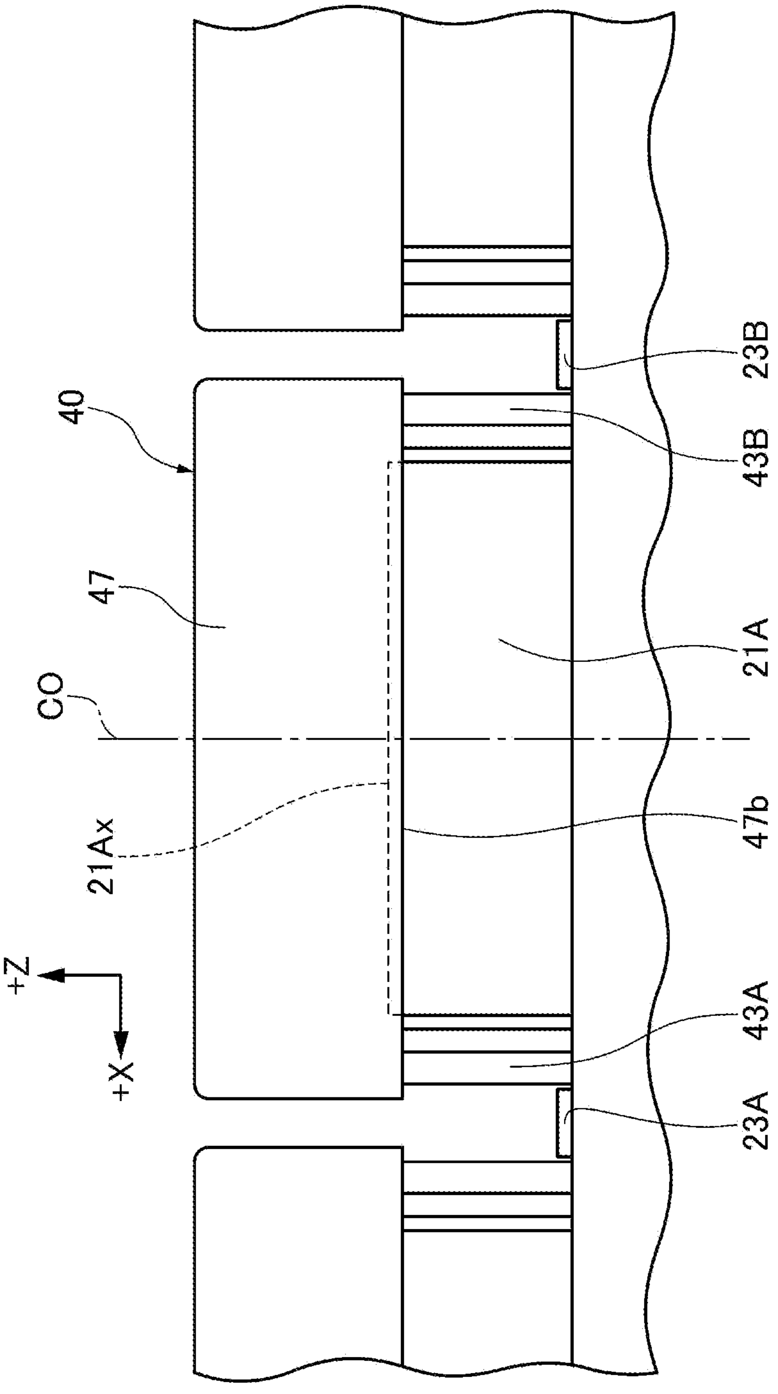
FIG. 2 is a front view of an acoustic processing device as viewed from a +Y side.

FIG. 2 is a front view of the acoustic processing device 100 as viewed from the +Y side. As shown in FIG. 1, the acoustic processing device 100 includes operation switches 40 (pressing operation portion) as a type of the operator in addition to the housing 10. The number of the operation switches 40 is not limited as long as the number is one or more. Since the configurations of the plurality of operation switches 40 are common to each other, any one of the operation switches 40 will be described below.

The operation switch 40 moves (displaced) in the Z direction with respect to the housing 10. The operation switch 40 includes a head portion 47, and the head portion 47 is pressed in a press-in direction parallel to a central axis CO (FIG. 2). The central axis CO is a straight line passing through the center of gravity of an operation surface of the head portion 47 and perpendicular to the operation surface. In a state in which the operation switch 40 is assembled to the housing 10, the central axis CO is parallel to the Z direction. The head portion 47 serves as an example of a head.

FIGS. 1 and 2 show the operation switch 40 in a non-pressed state (a state in which the operation 40 is not pressed). When the head portion 47 is pressed, the operation switch 40 moves in the −Z direction. When the pressing operation performed on the head portion 47 is released from the pressed state, the operation switch 40 returns to the non-pressed state by a reaction force from a dome-shaped switch portion 60 (a reaction force generator) to be described later.

Figure 3:
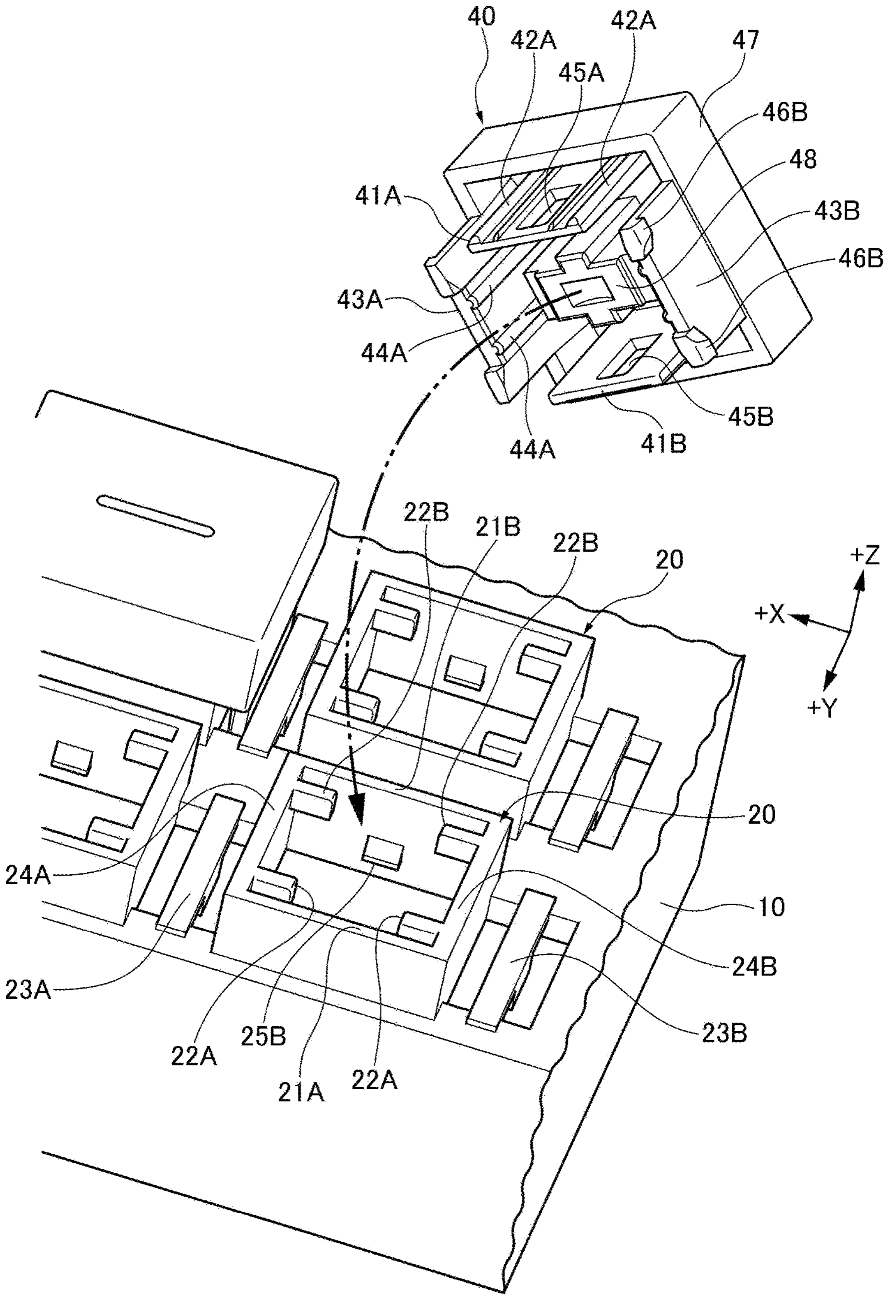
FIG. 3 is an exploded perspective view of the acoustic processing device showing a housing and a part of operation switches.

FIG. 3 is an exploded perspective view of the acoustic processing device 100 showing the housing 10 and a part of the operation switches 40. A plurality of receiving portions 20 are provided in the housing 10 corresponding to the respective operation switches 40. Since the configurations of the receiving portions 20 are common to each other, any one of the receiving portions 20 will be described below.

Figure 4:
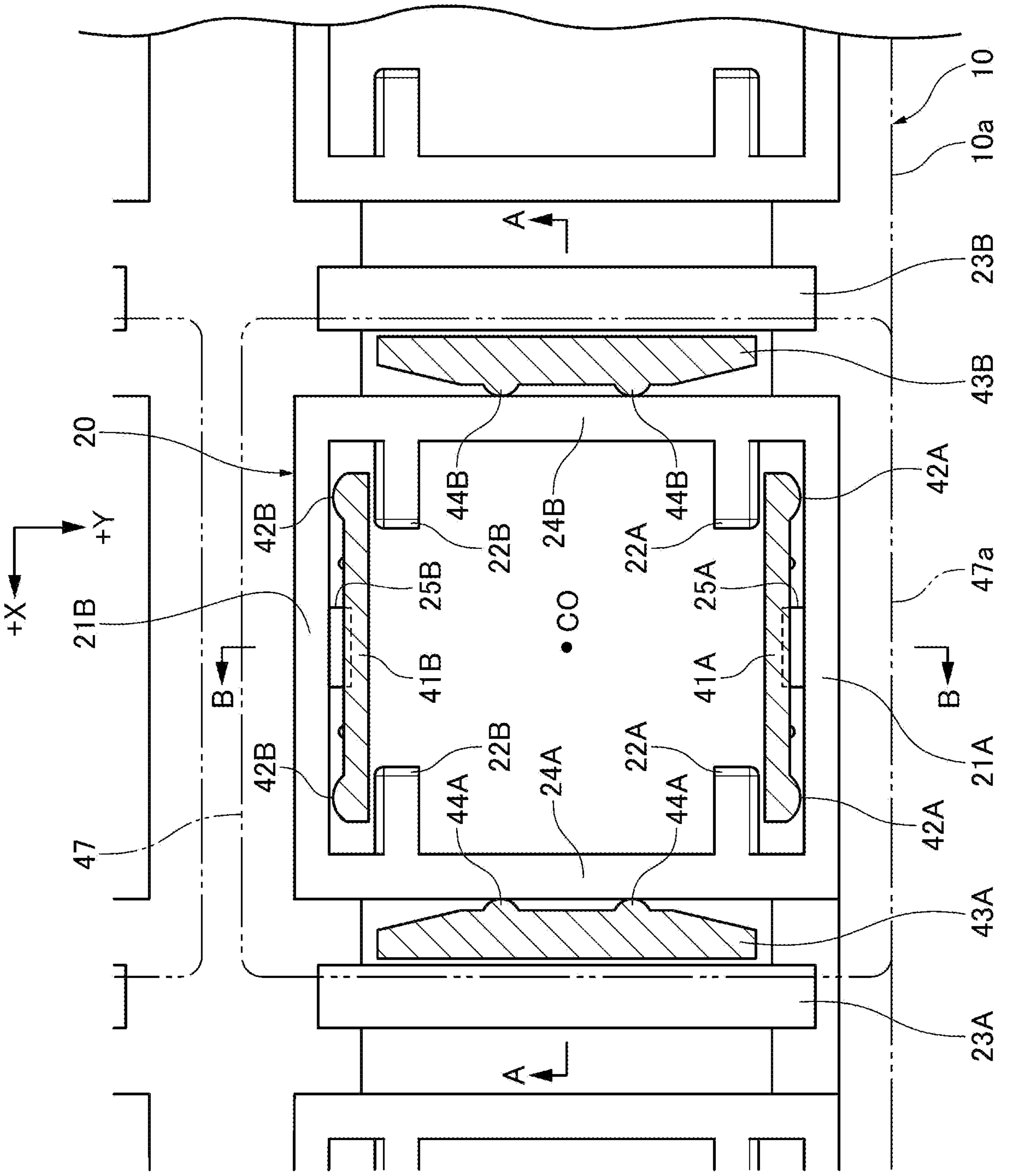
FIG. 4 shows a top view of a receiving portion as viewed from a +Z side and a partial horizontal cross-sectional view of the operation switch.
Figure 5:
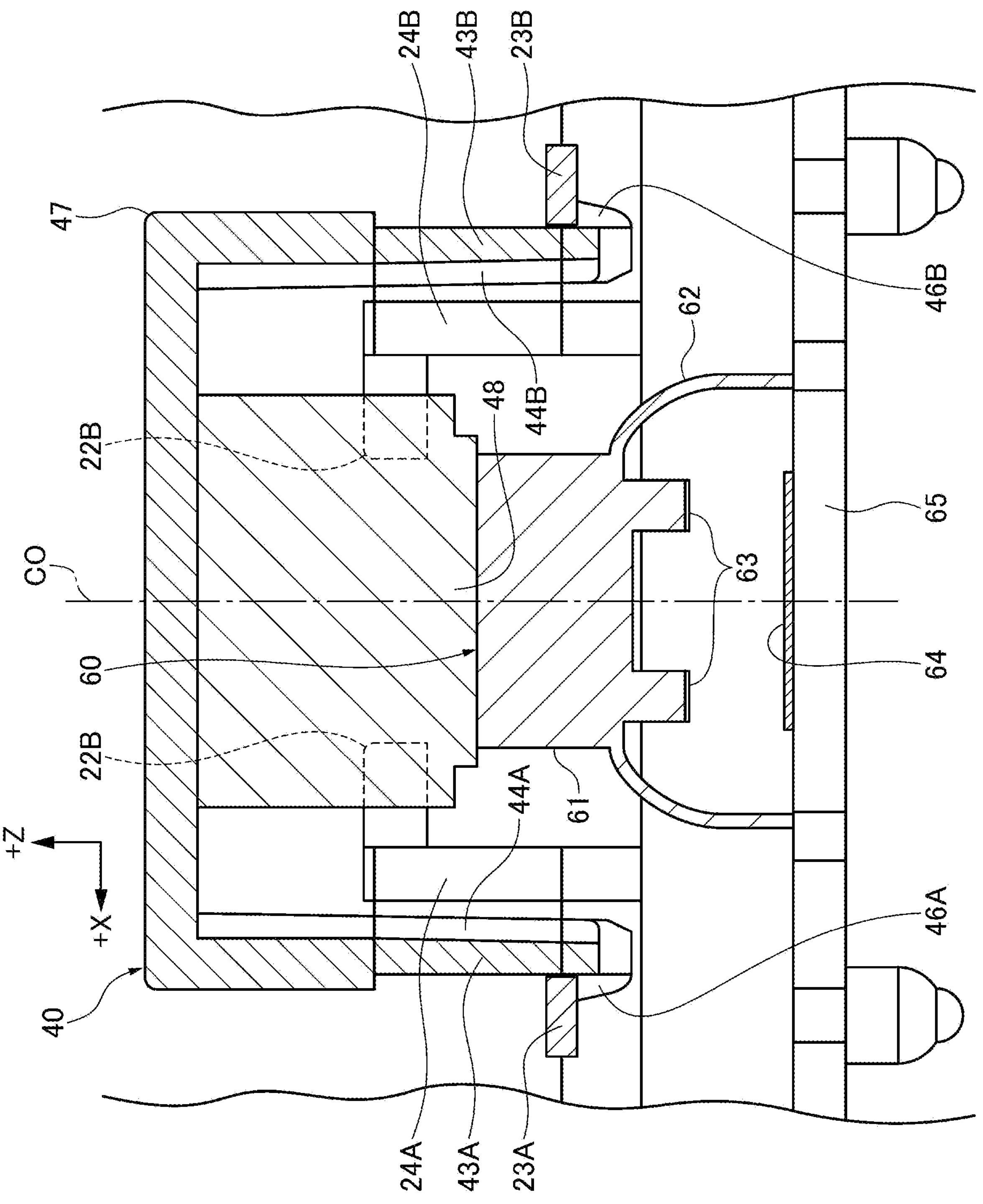
FIG. 5 is a cross-sectional view taken along a line A-A of FIG. 4.
Figure 6:
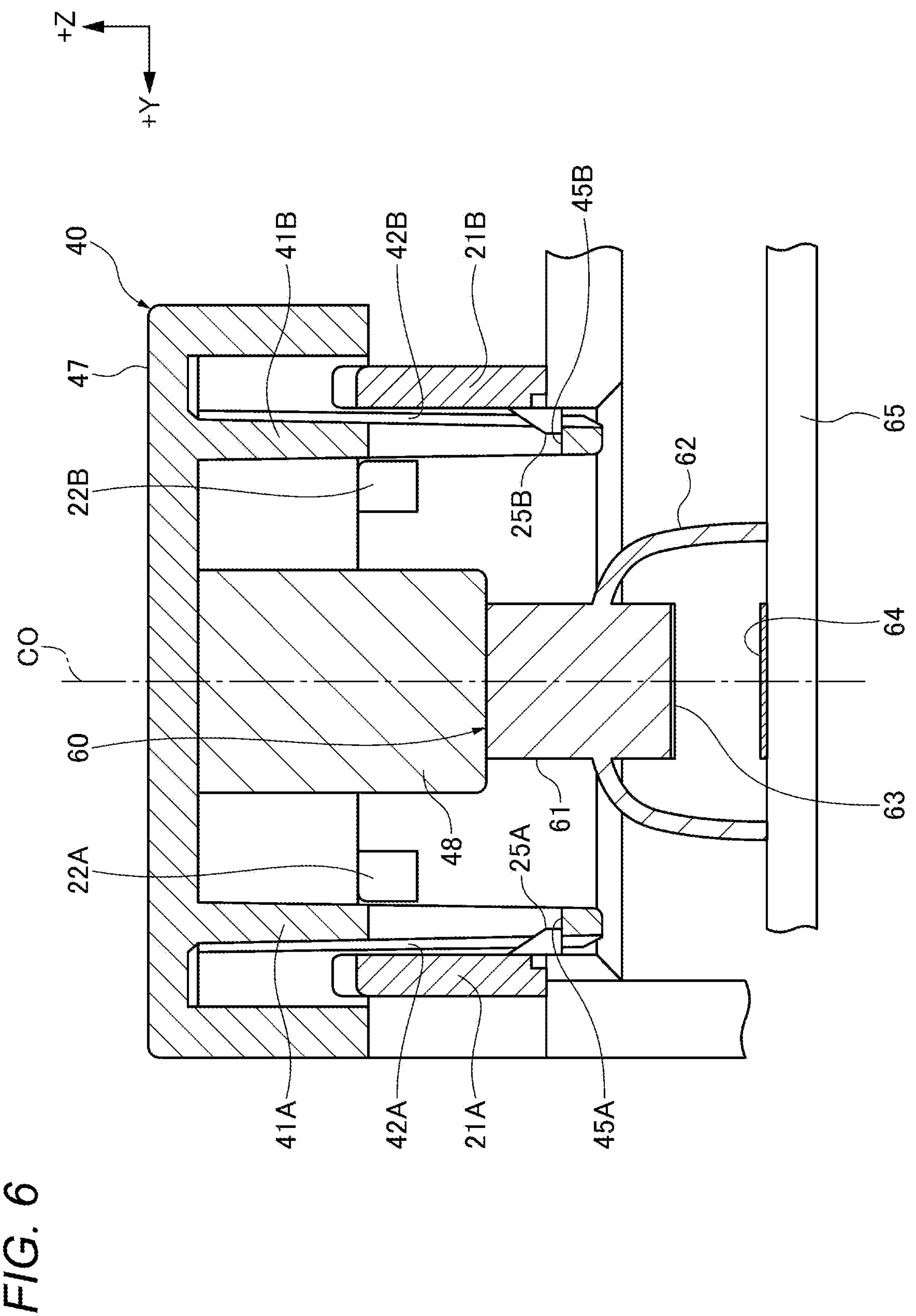
FIG. 6 is a cross-sectional view taken along a line B-B in FIG. 4.

FIG. 4 shows a top view of the receiving portion 20 as viewed from a +Z side and a partial horizontal cross-sectional view of the operation switch 40. As shown in FIG. 3, the operation switch 40 includes first guided portions 41A, 41B and second guided portions 43A, 43B. FIG. 4 shows cross sections of the first guided portions 41A, 41B and the second guided portions 43A, 43B of the operation switch 40. FIG. 5 is a cross-sectional view taken along a line A-A of FIG. 4. FIG. 6 is a cross-sectional view taken along a line B-B of FIG. 4.

First, the operation switch 40 will be described. As shown in FIG. 3, the first guided portions 41A, 41B extend from the head portion 47 of the operation switch 40 in the press-in direction. The first guided portions 41A, 41B are provided on an inner side of the outline of the head portion 47 when viewed from the press-in direction (FIG. 4). The second guided portions 43A, 43B extend from the head portion 47 in the press-in direction. As shown in FIG. 4, the second guided portions 43A, 43B are located at different positions (different phases) from positions of the first guided portions 41A and 41B located in a circumferential direction around the central axis CO. In other words, the second guided portions 43A, 43B are provided at positions different from those of the first guided portions 41A, 41B relative to the head portion 47. In an assembled state of the operation switch 40 to the receiving portion 20, all the guided portions 41A, 41B, 43A, 43B are plate-shaped portions parallel to the Z direction.

As shown in FIGS. 4 and 6, the first guided portions 41A, 41B are located at positions facing each other across the central axis CO. In other words, the first guided portion 41A and the first guided portion 41B are disposed at positions having a phase difference of 180° in the circumferential direction around the central axis CO. Two ribs 42A are formed on an outer side of the first guided portion 41A in a radial direction around the central axis CO. Two ribs 42B are formed on an outer side of the first guided portion 41B in the radial direction around the central axis CO. As shown in FIGS. 4 and 5, the second guided portion 43A and the second guided portion 43B are located at positions facing each other across the central axis CO. Two ribs 44A are formed on an inner side of the second guided portion 43A in the radial direction around the central axis CO. Two ribs 44B are formed on an inner side of the second guided portion 43B in the radial direction around the central axis CO. The ribs 42A, 42B, 44A, and 44B are all parallel to the Z direction.

Holes 45A, 45B are formed in the first guided portions 41A, 41B, respectively (FIGS. 3 and 6). Hook portions 46A, 46B are provided at distal ends of the second guided portions 43A, 43B, respectively (FIG. 5).

As shown in FIGS. 5 and 6, a protruding portion 48 protrudes in the −Z direction from the head portion 47 of the operation switch 40 (see also FIG. 3). The protruding portion 48 is disposed in a region surrounded by the guided portions 41A, 41B, 43A, and 43B and through which the central axis CO passes. The protruding portion 48 is a portion that presses the dome-shaped switch portion 60 to be described later in conjunction with a pressing operation of the operation switch 40.

Next, the receiving portion 20 will be described. As shown in FIGS. 3, 4, 5, and 6, a substrate 65 is provided in the housing 10. The receiving portion 20 includes the switch portion 60 and a fixed contact 64. The fixed contact 64 is disposed on the substrate 65. The switch portion 60 includes a pressed portion 61 and a skirt portion 62 connected to a lower portion of the pressed portion 61. A lower portion of the skirt portion 62 is fixed to the substrate 65. The skirt portion 62 has elasticity. The pressed portion 61 is in contact with the protruding portion 48 in the non-pressed state. The skirt portion 62 normally biases the protruding portion 48 of the operation switch 40 in the +Z direction via the pressed portion 61 by an elastic force. Accordingly, the switch portion 60 functions as a reaction force generator that is elastically deformed by being pressed by the operation switch 40 to generate a reaction force.

A movable contact 63 facing the fixed contact 64 is provided below the pressed portion 61. In the pressing process, the movable contact 63 moves in conjunction with the operation switch 40. The pressed portion 61 is pressed by the protruding portion 48 to move downward (−Z direction), and when the movable contact 63 comes into contact with the fixed contact 64, the movable contact 63 and the fixed contact 64 are brought into an electrically conductive state. That is, the switch becomes a make state (ON). In the electrically conductive state, for example, the operation of the operation switch 40 is detected, and an operation corresponding to the operation of the operation switch 40 is executed. Content of the operation in accordance with the operation of the operation switch 40 is not limited.

In the present embodiment, the movable contact 63 is provided in the switch portion 60, but this is not essential. For example, the movable contact may be provided in the operation switch 40. Therefore, the function of generating the reaction force and the function of making the switch make makeup may be separately provided.

As shown in FIG. 3, the receiving portion 20 is provided with a first restriction portion 21A and third restriction portions 22A corresponding to the first guided portion 41A, and a first restriction portion 21B and third restriction portions 22B corresponding to the first guided portion 41B. Further, the receiving portion 20 is provided with a second restriction portion 24A and a fourth restriction portion 23A corresponding to the second guided portion 43A, and a second restriction portion 24B and a fourth restriction portion 23B corresponding to the second guided portion 43B.

The hook portions 25A, 25B protrude from the first restriction portions 21A, 21B in directions facing each other (FIG. 4). As shown in FIG. 3, when the operation switch 40 is assembled to the receiving portion 20, the hook portions 25A, 25B are caught in the holes 45A, 45B of the first guided portions 41A and 41B, respectively, thereby preventing the first guided portions 41A, 41B from coming off (FIG. 6). At the same time, the hook portions 46A, 46B of the second guided portions 43A, 43B are caught by the fourth restriction portions 23A, 23B, thereby preventing the second guided portions 43A, 43B from coming off (FIG. 5).

As shown in FIG. 4, the first restriction portion 21A and the third restriction portions 22A respectively face the first guided portion 41A from the outer side and the inner side in the radial direction around the central axis CO, and engage with the first guided portion 41A. The first restriction portion 21B and the third restriction portions 22B respectively face the first guided portion 41B from the outer side and the inner side in the radial direction around the central axis CO, and engage with the first guided portion 41B. In other words, the first restriction portion 21A faces the first guided portion 41A from the outer side of the first guided portion 41A, the third restriction portions 22A face the first guided portion 41A from the inner side of the first guided portion 41A, the first restriction portion 21B faces the first guided portion 41B from the outer side of the first guided portion 41B, and the third restriction portions 22B face the first guided portion 41B from the inner side of the first guided portion 41B.

The second restriction portion 24A and the fourth restriction portion 23A respectively face the second guided portion 43A from the inner side and the outer side in the radial direction around the central axis CO, and engage with the second guided portion 43A. The second restriction portion 24B and the fourth restriction portion 23B respectively face the second guided portion 43B from the inner side and the outer side in the radial direction around the central axis CO, and engage with the second guided portion 43B. In other words, the second restriction portion 24A faces the second guided portion 43A from the inner side of the second guided portion 43A, the fourth restriction portion 23A faces the second guided portion 43A from the outer side of the second guided portion 43A, the second restriction portion 24B faces the second guided portion 43B from the inner side of the second guided portion 43B, and the fourth restriction portions 23B faces the second guided portion 43B from the outer side of the second guided portion 43B.

In the pressing process of the operation switch 40, that is, during pressing of the head portion 47, the first guided portion 41A moves while being guided between the first restriction portion 21A and the third restriction portions 22A, and the first guided portion 41B moves while being guided between the first restriction portion 21B and the third restriction portions 22B. The second guided portion 43A moves while being guided between the second restriction portion 24A and the fourth restriction portion 23A, and the second guided portion 43B moves while being guided between the second restriction portion 24B and the fourth restriction portion 23B.

When the first guided portions 41A, 41B move in the Z direction, the ribs 42A, 42B slide while being in contact with the restriction portions 21A, 21B or do not in contact with the restriction portions 21A, 21B. When the second guided portions 43A, 43B move in the Z direction, the ribs 44A, 44B slide while being in contact with the restriction portions 24A, 24B or do not in contact with the restriction portions 24A, 24B. The ribs 42A, 42B, 44A, and 44B are formed in the Z direction to reduce sliding friction and contribute to smooth movement of the operation switch 40. However, it is not essential to provide the ribs 42A, 42B, 44A, and 44B.

Here, a direction in which movement of the first guided portion 41A is restricted by the first restriction portion 21A and the third restriction portions 22A is a Y direction, and a direction in which movement of the first guided portion 41B is restricted by the first restriction portion 21B and the third restriction portions 22B is also the Y direction. On the other hand, a direction in which movement of the second guided portion 43A is restricted by the second restriction portion 24A and the fourth restriction portion 23A is an X direction, and a direction in which movement of the second guided portion 43B is restricted by the second restriction portion 24B and the fourth restriction portion 23B is also the X direction. The Y direction and the X direction form a right angle and are not parallel to each other.

Accordingly, the operation switch 40 moves in the Z direction while the movement thereof in an X-Y plane is restricted by the restriction portions 21A to 24A and 21B to 24B. When viewed from the Z direction, the restriction portions 21A, 21B, 24A, and 24B form an annular rectangle as a whole. The second guided portions 43A, 43B are located outside the rectangle formed by the restriction portions 21A, 21B, 24A, and 24B, and thus can be disposed at positions as far as possible from the central axis CO. Accordingly, a guide function is stabilized, and the operation switch 40 smoothly moves in parallel. Further, the restriction portions 21A, 21B, 24A, and 24B are plate-shaped (planar) wall portions parallel to the Z direction. Therefore, the entire operation switch 40 is prevented from being inclined in a direction having an angle with respect to the Z axis. This also contributes to smooth parallel movement of the operation switch 40. Further, the configuration for the parallel movement is not complicated. The parallel movement here means that the operation surface of the head portion 47 of the operation switch 40 is displaced in the Z direction while being substantially perpendicular to the Z axis.

Depending on the model, a light emitting unit (not shown) may be provided on the substrate 65 while avoiding the fixed contact 64. As shown in FIG. 1, the head portion 47 is provided with a transparent portion 49. Light of the light emitting unit is visually recognized through the transparent portion 49. The light emitting unit may emit light at all times or may emit light only during switch make.

As shown in FIG. 2, in the non-pressed state of the operation switch 40, a lower end position 47*b* of the head portion 47 in the press-in direction is the same as or lower than an upper end position 21Ax of the first restriction portion 21A. Even when the operation switch 40 is pressed, the lower end position 47*b* does not become higher than the upper end position 21Ax. Here, the first guided portion 41A (FIG. 4) is located on a side where the user is situated (+Y side) with the central axis CO as a reference. Accordingly, the first guided portion 41A is hidden by the head portion 47 and the first restriction portion 21A so as not to be visually recognized by the user. This contributes to improvement of the appearance viewed from the user.

As shown in FIG. 4, a side surface 47*a* (front surface) of the head portion 47 on the side (+Y side) where the first restriction portion 21A is disposed with the central axis CO as a reference is flush with a side surface 10*a* of the housing 10 on the +Y side. This also contributes to improvement in appearance.

The acoustic processing device 100 is manufactured, for example, as follows. An operator molds each of the housing 10 and the operation switch 40 from a resin. The operator mounts the fixed contact 64 and the switch portion 60 on the substrate 65, and disposes the substrate 65 on the housing 10. The operator presses and fits the operation switch 40 into each receiving portion 20. Then, the hook portions 25A, 25B of the first restriction portions 21A, 21B are caught by the holes 45A, 45B of the first guided portions 41A, 41B, respectively; the hook portions 46A, 46B of the second guided portions 43A, 43B are caught by the fourth restriction portions 23A, 23B, respectively. In this way, the operation switch 40 is attached to the receiving portion 20 in a state of being movable in the press-in direction with respect to the receiving portion 20 and prevented from coming off.

According to the present embodiment, the restriction portions 21A, 22A face the first guided portion 41A from the outer side and the inner side in the radial direction around the central axis CO. The restriction portions 21B, 22B face the first guided portion 41B from the outer side and the inner side in the radial direction. The restriction portions 24A, 23A face the second guided portion 43A from the inner side and the outer side in the radial direction. The restriction portions 24B, 23B face the second guided portion 43B from the inner side and the outer side in the radial direction. In the pressing process of the operation switch 40, the first guided portion 41A moves while being guided between the restriction portions 21A and 22A, and the first guided portion 41B moves while being guided between the restriction portions 21B and 22B. The second guided portion 43A moves while being guided between the restriction portions 24A and 23A, and the second guided portion 43B moves while being guided between the restriction portions 24B and 23B. The direction (Y direction) in which movement of the guided portions 41A, 41B is restricted by the restriction portions 21A, 22A, 21B, and 22B is not parallel to the direction (X direction) in which movement of the guided portions 43A and 43B is restricted by the restriction portions 24A, 23A, 24B, and 23B. Thus, it is possible to ensure a smooth parallel movement of the pressing operation portion (operation switch 40) with a simple configuration, and to suppress deterioration in the appearance.

Next, modifications will be considered.

The first guided portion 41A and the restriction portions 21A, 22A, and the first guided portion 41B and the restriction portions 21B, 22B are disposed at positions facing each other across the central axis CO. That is, both are disposed at positions of a phase difference of 180° in the circumferential direction around the central axis CO. Thus, the guide function of the operation switch 40 is stabilized. However, from the viewpoint of ensuring a smooth parallel movement of the operation switch 40, the present disclosure is not limited thereto. Both may be disposed at positions of a phase difference exceeding 90° in the circumferential direction around the central axis CO. Although two sets each including the first guided portion, the first restriction portion, and the third restriction portion are provided, three or more sets may be provided. Also in this case, when attention is paid to two sets among a plurality of sets, both in the two sets may be disposed at positions of phase differences exceeding 90° in the circumferential direction around the central axis CO.

Similarly, the second guided portion 43A and the restriction portions 24A, 23A, and the second guided portion 43B and the restriction portions 24B, 23B are disposed at positions facing each other across the central axis CO. Thus, the guide function of the operation switch 40 is stabilized. However, from the viewpoint of ensuring smooth parallel movement of the operation switch 40, both may be disposed at positions of the phase difference exceeding 90° in the circumferential direction around the central axis CO. Although two sets each including the second guided portion, the second restriction portion, and the fourth restriction portion are provided, three or more sets may be provided. Also in this case, when attention is paid to two sets among the plurality of sets, both in the two sets may be disposed at positions of phase differences exceeding 90° in the circumferential direction around the central axis CO.

Note that the configuration may be simplified in a case of considering a minimum limit configuration for ensuring smooth parallel movement of the pressing operation portion with a simple configuration and ensuring the effect of suppressing deterioration of the appearance. For example, as described below, it is possible to eliminate a part of the guided portions 41A, 41B, 43A, and 43B and the restriction portions 21A to 24A and 21B to 24B.

First, the first restriction portion 21A engages with the first guided portion 41A to restrict movement of the first guided portion 41A in the first direction (+Y direction) away from the central axis CO. The third restriction portions 22A engage with the first guided portion 41A to restrict movement of the operation switch 40 (first guided portion 41A) in a second direction (−Y direction) opposite to the first direction. Here, the first restriction portion 21B engages with the first guided portion 41B to restrict the movement of the operation switch 40 in the second direction (−Y direction).

Both the third restriction portions 22A and the first restriction portion 21B cooperate with the first restriction portion 21A to guide the movement of the operation switch 40 in the pressing process. Further, if it is limited to the movement restriction in the −Y direction, the first restriction portion 21B has the same function as the third restriction portion 22A. Therefore, either the third restriction portions 22A or the first restriction portion 21B may be eliminated. For example, when the first restriction portion 21A and the third restriction portions 22A are provided and the first restriction portion 21B is eliminated, the first guided portion 41B and the third restriction portions 22B may also be eliminated.

Similarly, the second restriction portion 24A engages with the second guided portion 43A from the inner side in the radial direction around the central axis CO, thereby restricting the movement of the second guided portion 43A in a third direction (−X direction) that is not parallel to the first direction and approaches the central axis CO. The fourth restriction portion 23A engages with the second guided portion 43A to restrict movement of the operation switch 40 (second guided portion 43A) in a fourth direction (+X direction) opposite to the third direction. Here, the second restriction portion 24B engages with the second guided portion 43B to restrict the movement of the operation switch 40 in a fourth direction (+X direction).

Each of the fourth restriction portion 23A and the second restriction portion 24B cooperates with the second restriction portion 24A to guide the movement of the operation switch 40 in the pressing process. Further, if it is limited to the movement restriction in the +X direction, the second restriction portion 24B has the same function as the fourth restriction portion 23A. Therefore, either the fourth restriction portion 23A or the second restriction portion 24B may be eliminated. For example, when the second restriction portion 24A and the fourth restriction portion 23A are provided and the second restriction portion 24B is eliminated, the second guided portion 43B and the fourth restriction portion 23B may also be eliminated.

A comprehensive consideration is as follows. First, conditions are shown.

Condition (a): The first guided portion 41A, the first restriction portion 21A, and the third restriction portions 22A are provided.

Condition (b): The first guided portion 41A, the first restriction portion 21A, and the first restriction portion 21B are provided (however, the first guided portion 41B or a portion corresponding thereto is also necessary as a portion restricted by the first restriction portion 21B).

Condition (c): The second guided portion 43A, the second restriction portion 24A, and the fourth restriction portion 23A are provided.

Condition (d): The second guided portion 43A, the second restriction portion 24A, and the second restriction portion 24B are provided (however, the second guided portion 43B or a portion corresponding thereto is also necessary as a portion restricted by the second restriction portion 24B).

In the case of considering the minimum limit configuration for ensuring the above-described effect, it is sufficient to satisfy "at least one of (a) and (b)" and "at least one of (c) and (d)" among the above-described conditions (a) to (d). Note that, although the above condition focuses on the first guided portion 41A and the second guided portion 43A, when focusing on the first guided portion 41B and the second guided portion 43B, it is understood that "A" is rewritten as "B".

For example, the guided portions 41A, 43A and the restriction portions 21A, 22A, 24A, and 23A may be provided, and the guided portions 41B, 43B and the restriction portions 21B, 22B, 24B, and 23B may be eliminated. Alternatively, the guided portions 41A, 43B and the restriction portions 21A, 22A, 24B, and 23B may be provided, and the guided portions 41B, 43A and the restriction portions 21B, 22B, 24A, and 23A may be eliminated.

The guided portions 41A, 41B, 43A, 43B and the restriction portions 21A, 21B, 24A, and 24B may be provided, and the restriction portions 22A, 22B, 23A, and 23B may be eliminated. Alternatively, on the premise that the restriction portion 21A is essential from the viewpoint of ensuring visual prevention of the first guided portion 41A, the guided portions 41A, 41B, 43A, and 43B and the restriction portions 21A, 21B, 23A, and 23B may be provided, and the restriction portions 22A, 22B, 24A, and 24B may be eliminated.

The first direction (+Y direction) and the third direction (−X direction) form a right angle. However, from the viewpoint of obtaining the effect of smoothly moving in parallel in the press-in direction while restricting the movement of the operation switch 40 on the X-Y plane, the first direction needs not to be parallel to the third direction.

Even in a case where a part of the guided portions 41A, 41B, 43A, and 43B and the restriction portions 21A to 24A and 21B to 24B are eliminated, the first guided portion 41A and the restriction portions 21A, 22A, and the first guided portion 41B and the restriction portions 21B, 22B may not be disposed at positions facing each other across the central axis CO. Similarly, the second guided portion 43A and the restriction portions 24A, 23A, and the second guided portion 43B and the restriction portions 24B, 23B may not be disposed at positions facing each other across the central axis CO. Specifically, the following arrangement may be adopted.

First, assuming that there are a plurality of sets each including the first guided portion and the first restriction portion, a set of the first guided portion 41A and the first restriction portion 21A among the plurality of sets is referred to as a "first set", and a set of the first guided portion 41B and the first restriction portion 21B is referred to as a "second set". The second set is disposed at a position of a phase difference exceeding 90° in the circumferential direction around the central axis CO with respect to the first set. In this case, the first restriction portion 21B included in the second set functions similarly to the third restriction portions 22A in that the first restriction portion 21B guides the movement of the operation switch 40 in cooperation with the first restriction portion 21A included in the first set. That is, from the viewpoint of guiding the first guided portion 41A, the first restriction portion 21B corresponds to the third restriction portion.

Further, it is assumed that there are a plurality of sets of the second guided portion and the second restriction portion, and among the plurality of sets, a set of the second guided portion 43A and the second restriction portion 24A is referred to as a "third set", and a set of the second guided portion 43B and the second restriction portion 24B is referred to as a "fourth set". The fourth set is disposed at a position of a phase difference exceeding 90° in the circumferential direction around the central axis CO with respect to the third set. In this case, the second restriction portion 24B included in the fourth set functions similarly to the fourth restriction portion 23A in that the second restriction portion 24B guides the movement of the operation switch 40 in cooperation with the second restriction portion 24A included in the third set. That is, the second restriction portion 24B corresponds to the fourth restriction portion from the viewpoint of guiding the second guided portion 43A.

Other modifications will be described with reference to FIGS. 7 to 9.

Figure 7:
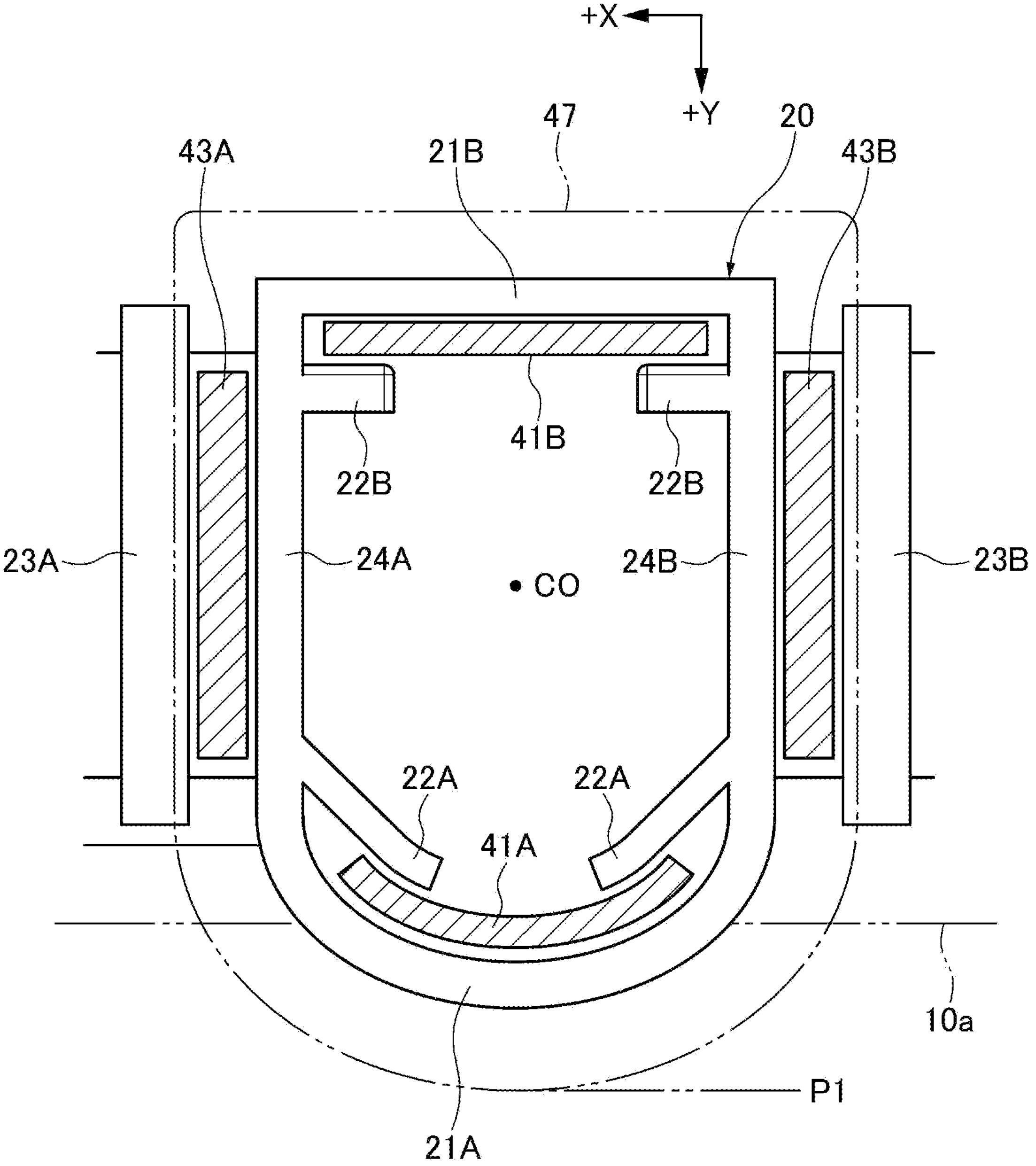
FIG. 7 is a schematic diagram showing a modification.
Figure 8:
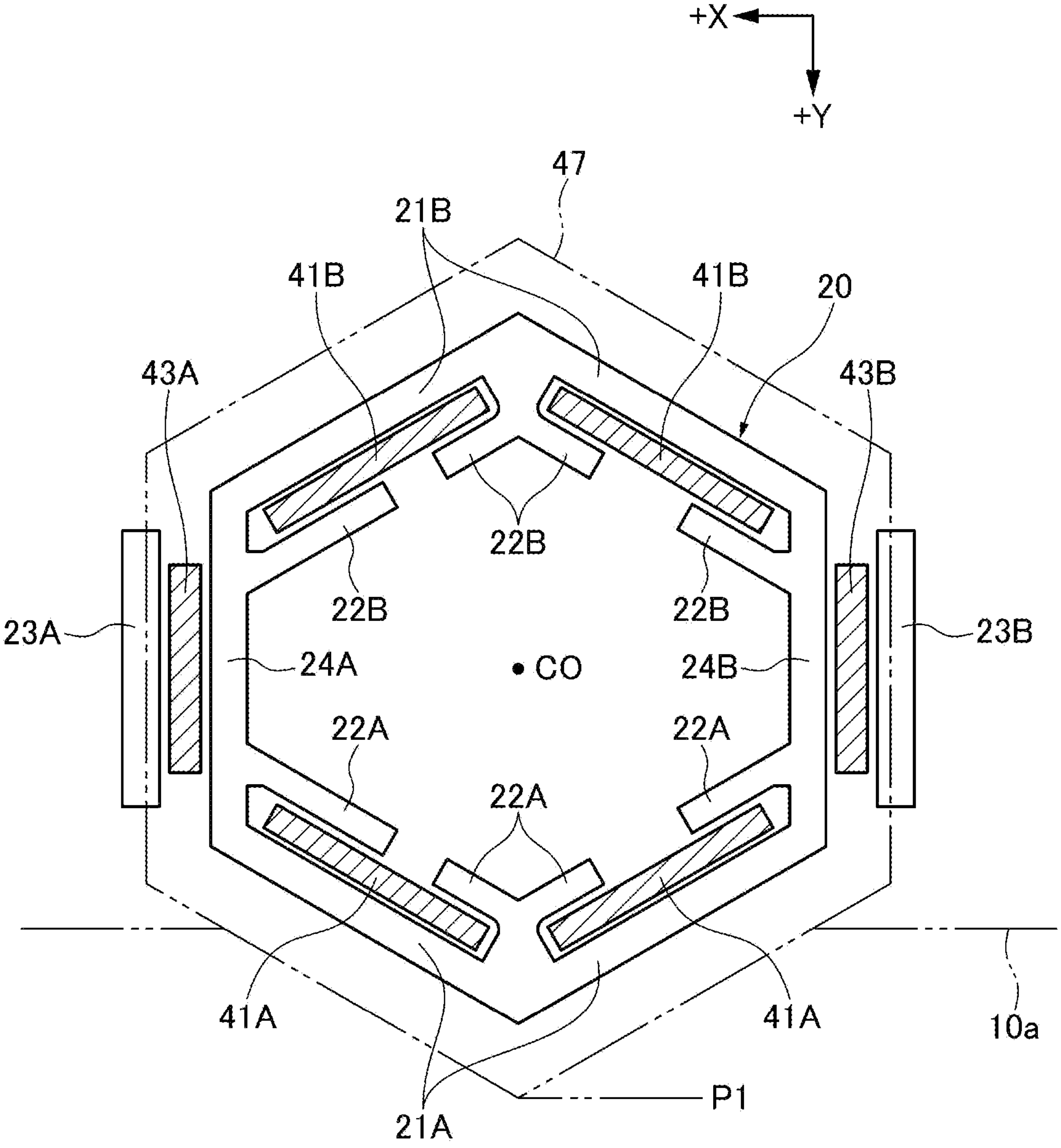
FIG. 8 is a schematic diagram showing a modification.
Figure 9:
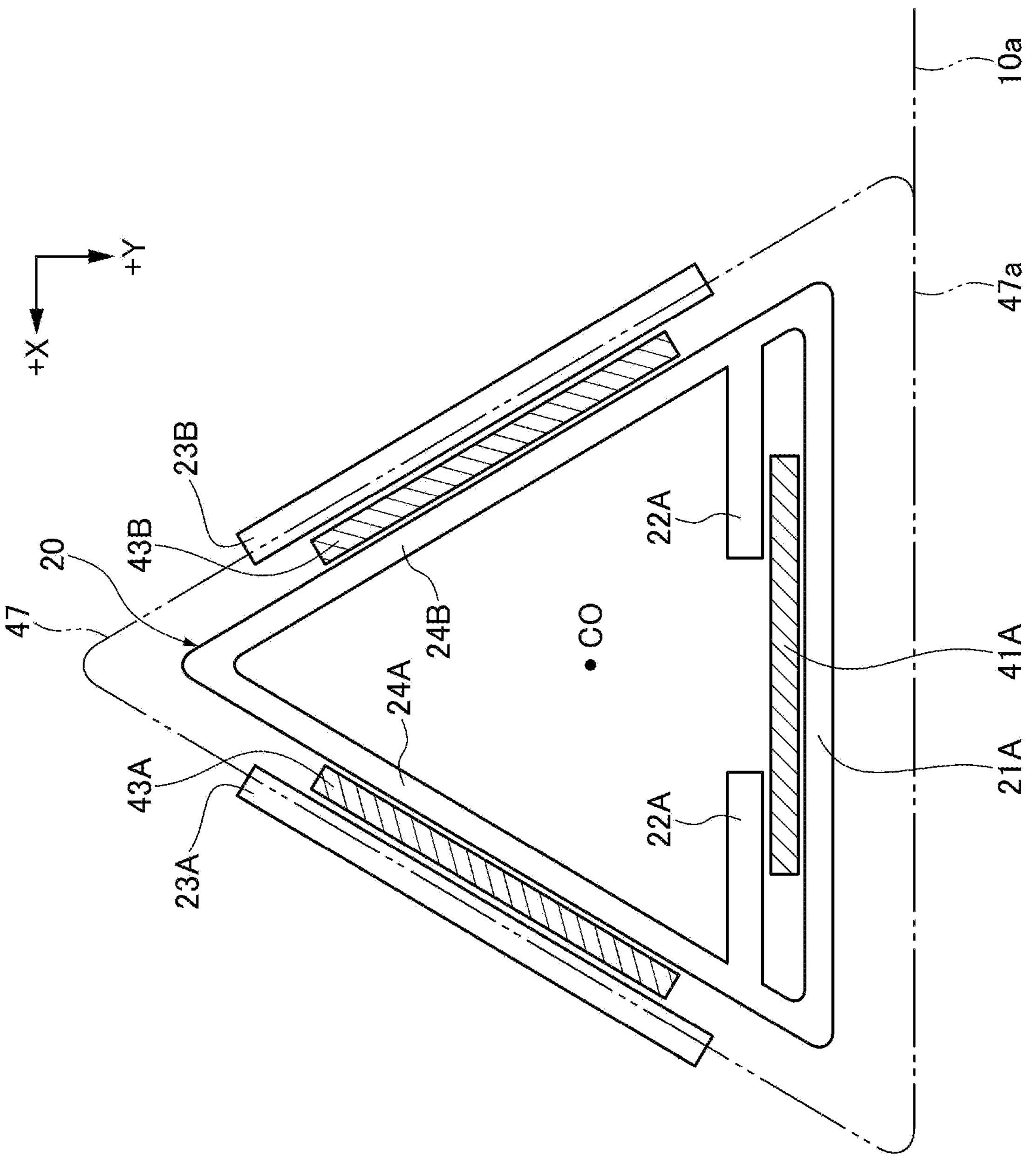
FIG. 9 is a schematic diagram showing a modification.

FIGS. 7 to 9 are schematic views showing a partial horizontal cross-sectional view of the operation switch 40 together with a top view of the receiving portion 20 viewed from the +Z side in the modifications. In FIGS. 7 to 9, shapes of the guided portions and the restriction portions are simplified and schematically shown.

First, the guided portions 41A, 41B, 43A, and 43B and the restriction portions 21A to 24A and 21B to 24B are not limited to a plate shape (a planar shape). In particular, the restriction portions 21A to 24A and 21B to 24B may have any shape as long as the movement restriction effect of the guided portions 41A, 41B, 43A, and 43B can be exerted. For example, the restriction portions 22A, 22B, 24A, and 24B disposed at an inner side of the guided portions 41A, 41B, 43A, and 43B may have a shape that comes into line contact with a member facing the restriction portions 22A, 22B, 24A, and 24B, such as a columnar shape. In particular, since the degree of freedom of the shape of the restriction portions disposed at the inner side of the guided portions 41A, 41B, 43A, and 43B is high, it is advantageous to save space and ensure a large space above the substrate 65.

FIG. 7 shows an example in which a part of the guided portions 41A, 41B, 43A, and 43B and the restriction portions 21A to 24A and 21B to 24B are curved when viewed from the Z direction. For example, as shown in FIG. 7, the first guided portion 41A may be curved to have an arc shape protruding toward the +Y side. The first restriction portion 21A and the third restriction portion 22A are also curved in accordance with the curve of the first guided portion 41A. A part or all of the other guided portions 41B, 43A, and 43B and the restriction portions 23A, 24A, and 21B to 24B may be curved. Further, each portion may be convex in a direction approaching the central axis CO.

In the example shown in FIG. 4, the side surface 47*a* of the head portion 47 on the +Y side is flush with the side surface 10*a* of the housing 10. However, as shown in FIG. 7, an end position P1 of the head portion 47 on the side (user side) where the first restriction portion 21A is disposed with the central axis CO as a reference may be disposed at the same position as the side surface 10*a* of the housing 10 on the same side or may protrude from the side surface 10*a*.

The shape of the receiving portion 20 viewed from the Z direction is a square in the example shown in FIG. 4, but may be another polygon as shown in FIGS. 8 and 9, or may be a shape including a curved portion (arc portion) as shown in FIG. 7. The shape of the receiving portion 20 mentioned here is recognized by the restriction portions 21A, 21B, 24A, and 24B.

For example, in the example shown in FIG. 8, the receiving portion 20 has a hexagonal shape, and there are two sets each including the first guided portion 41A, the first restriction portion 21A, and the third restriction portion 22A, and there are two sets each including the first guided portion 41B, the first restriction portion 21B, and the third restriction portion 22B. The end position P1 of the head portion 47 on the user side protrudes from the side surface 10*a* of the housing 10.

In the example shown in FIG. 9, the receiving portion 20 has a triangular shape, and only one set of the first guided portion 41A, the first restriction portion 21A, and the third restriction portion 22A is provided. The side surface 47*a* of the head portion 47 on the +Y side is flush with the side surface 10*a* of the housing 10.

Even when the modifications shown in FIGS. 7 to 9 are adopted, the lowest configuration discussed above may be adopted. For example, the third restriction portions 22A, 22B may be eliminated in the example shown in FIG. 8, and the fourth restriction portions 23A, 23B may be eliminated in the examples shown in FIGS. 7 to 9.

Note that, in the present embodiment or the modifications, the third restriction portions 22A are configured to protrude in the facing direction and separated from each other. However, this is a design determined from the viewpoint of convenience in manufacturing and ensuring strength. Therefore, from the viewpoint of obtaining the above effect, the two third restriction portions 22A may be connected to form one bridge-shaped restriction portion.

The switch structure of the present disclosure is not limited to the acoustic processing device 100, and can be applied to various other devices and electronic devices including a switch.

Although the present disclosure has been described in detail based on a preferred embodiment thereof, the present disclosure is not limited to the specific embodiment, and various forms without departing from the scope of the present disclosure are also included in the present disclosure. Some of the above-described embodiment and modifications may be appropriately combined.

The invention claimed is:

1. A switch structure of an operation switch disposed in a housing, the switch structure comprising:

- a head configured to move with respect to the housing, the head being configured to be pressed in a press-in direction parallel to a central axis of the operation switch;
- a first guided portion extending from the head in the press-in direction on an inner side of an outline of the head as viewed from the press-in direction;
- a second guided portion provided at a position different from that of the first guided portion relative to the head and extending from the head in the press-in direction;
- a first restriction portion provided in the housing and facing the first guided portion from an outer side of the first guided portion; and
- a second restriction portion provided in the housing and facing the second guided portion from an inner side of the second guided portion,
- wherein, during pressing of the head, the first guided portion moves while being guided by the first restriction portion, and the second guided portion moves while being guided by the second restriction portion,
- wherein a direction of movement of the first guided portion is restricted by the first restriction portion and is not parallel to a direction of movement of the second guided portion that is restricted by the second restriction portion,
- wherein the first guided portion is located inside a region defined by the first restriction portion and the second restriction portion, and
- wherein the second guided portion is located outside the region defined by the first restriction portion and the second restriction portion.

2. The switch structure according to claim 1, further comprising:

- a third restriction portion provided in the housing and facing the first guided portion from an inner side of the first guided portion; and
- a fourth restriction portion provided in the housing and facing the second guided portion from an outer side of the second guided portion,
- wherein, during the pressing of the head, the first guided portion moves while being guided between the first restriction portion and the third restriction portion, and the second guided portion moves while being guided between the second restriction portion and the fourth restriction portion.

3. The switch structure according to claim 1, further comprising:

- a plurality of sets, including a first set and a second set, each including the first guided portion and the first restriction portion, and
- the second set is disposed at a position with respect to the first set so that a phase difference exceeds 90° in a circumferential direction around the central axis.

4. The switch structure according to claim 3, wherein the first set and the second set are disposed at positions facing each other across the central axis.

5. The switch structure according to claim 1, further comprising:

- a plurality of sets, including a first set and a second set, each including the second guided portion and the second restriction portion, and
- the second set is disposed at a position with respect to the first set so that a phase difference exceeds 90° in the circumferential direction around the central axis.

6. The switch structure according to claim 5, wherein the first set and the second set are disposed at positions facing each other across the central axis.

7. The switch structure according to claim 1, wherein the direction of movement of the first guided portion restricted by the first restriction portion and the direction of movement of the second guided portion restricted by the second restriction portion are perpendicular to each other.

8. The switch structure according to claim 1, wherein, in a non-pressed state of the head, a lower end position of the head in the press-in direction is the same as or lower than an upper end position of the first restriction portion.

9. The switch structure according to claim 1, wherein a side surface of the head on a side where the first restriction portion is disposed is flush with a side surface of the housing on the side where the first restriction portion is disposed.

10. The switch structure according to claim 1, wherein an end position of the head on a side where the first restriction portion:

is disposed at the same position as a side surface of the housing on the side where the first restriction portion is disposed; or protrudes from the side surface.

11. The switch structure according to claim 1, wherein the first restriction portion is disposed on a side where a user who operates the operation switch is situated.

12. The switch structure according to claim 1, wherein the housing further includes a reaction force generator configured to be elastically deformed to generate a reaction force during the pressing of the head.

13. The switch structure according to claim 1, further comprising:

a movable contact configured to move in conjunction with the pressing of the head, wherein the housing further includes a fixed contact configured to be brought into an electrically conductive state by contacting the movable contact.

14. The switch structure according to claim 1, wherein the second guided portion extends from the outline of the head in the press-in direction.

15. An acoustic processing device comprising:

a switch structure of an operation switch disposed in a housing, the switch structure comprising:

a head configured to move with respect to the housing, the head being configured to be pressed in a press-in direction parallel to a central axis of the operation switch;

a first guided portion extending from the head in the press-in direction on an inner side of an outline of the head as viewed from the press-in direction;

a second guided portion provided at a position different from that of the first guided portion relative to the head and extending from the head in the press-in direction;

a first restriction portion provided in the housing and facing the first guided portion from an outer side of the first guided portion; and a second restriction portion provided in the housing and facing the second guided portion from an inner side of the second guided portion, wherein, during pressing of the head, the first guided portion moves while being guided by the first restriction portion, and the second guided portion moves while being guided by the second restriction portion, wherein a direction of movement of the first guided portion is restricted by the first restriction portion and is not parallel to a direction of movement of the second guided portion that is restricted by the second restriction portion, wherein the first guided portion is located inside a region defined by the first restriction portion and the second restriction portion, and wherein the second guided portion is located outside the region defined by the first restriction portion and the second restriction portion, and wherein sound information is input in accordance with the pressing of the head.

* * * * *